United States Patent
Ohashi

(10) Patent No.: US 9,232,401 B2
(45) Date of Patent: Jan. 5, 2016

(54) INFORMATION PROCESSING APPARATUS AND CONTROL METHOD

(71) Applicant: KABUSHIKI KAISHA TOSHIBA, Minato-ku, Tokyo (JP)

(72) Inventor: Jun Ohashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 13/939,907

(22) Filed: Jul. 11, 2013

(65) Prior Publication Data

US 2014/0137245 A1    May 15, 2014

(30) Foreign Application Priority Data

Nov. 14, 2012 (JP) ................... 2012-250014

(51) Int. Cl.
*H04W 12/08* (2009.01)
*H04L 29/06* (2006.01)

(52) U.S. Cl.
CPC ............... *H04W 12/08* (2013.01); *H04L 63/20* (2013.01)

(58) Field of Classification Search
CPC ...................................................... H04L 63/20
USPC ............................................................ 726/22
See application file for complete search history.

(56) References Cited

U.S. PATENT DOCUMENTS

| 2006/0156380 A1* | 7/2006 | Gladstone et al. ................. 726/1 |
| 2012/0185910 A1* | 7/2012 | Miettinen et al. ................. 726/1 |

FOREIGN PATENT DOCUMENTS

| JP | 11-113062 A | 4/1999 |
| JP | 2010-092220 A | 4/2010 |
| JP | 2012-039544 A | 2/2012 |
| JP | 2012-053836 A | 3/2012 |

* cited by examiner

*Primary Examiner* — Jacob Lipman
(74) *Attorney, Agent, or Firm* — Knobbe, Martens Olson & Bear LLP

(57) ABSTRACT

According to one embodiment, a controller detects generation of an event and transmits a content of the event to a management module. The management module transmits to the controller a determination result which represents permission or inhibition of execution of the processing. The determination result is decided based on a first policy or a second policy different from the first policy that are selectively employed in accordance with a use situation of the apparatus. The management module decides whether to notify a server of the content of the event, in accordance with which of a period in which the first policy is employed and a period in which the second policy is employed is a period in which the event has occurred.

11 Claims, 7 Drawing Sheets

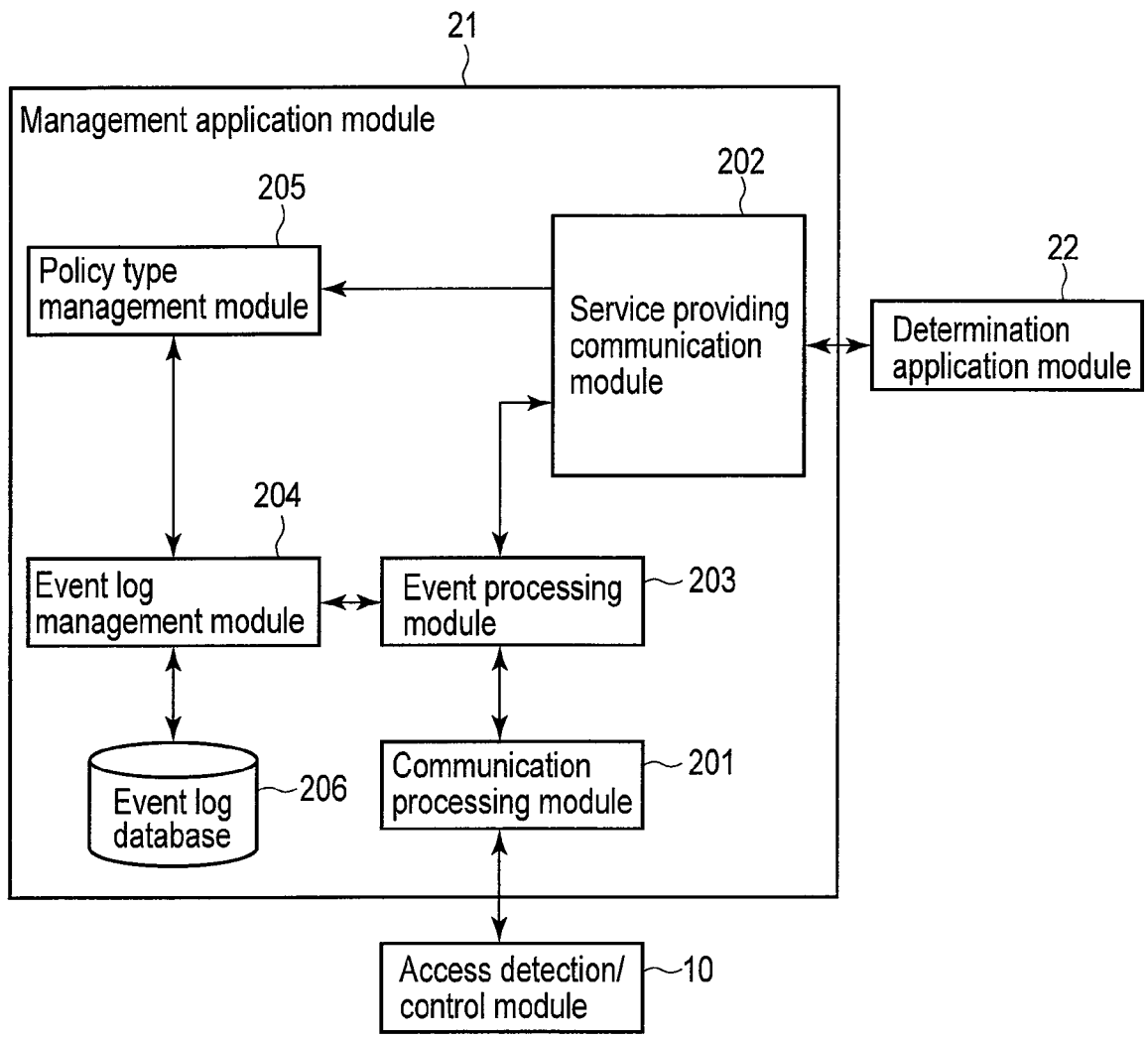
F I G. 3

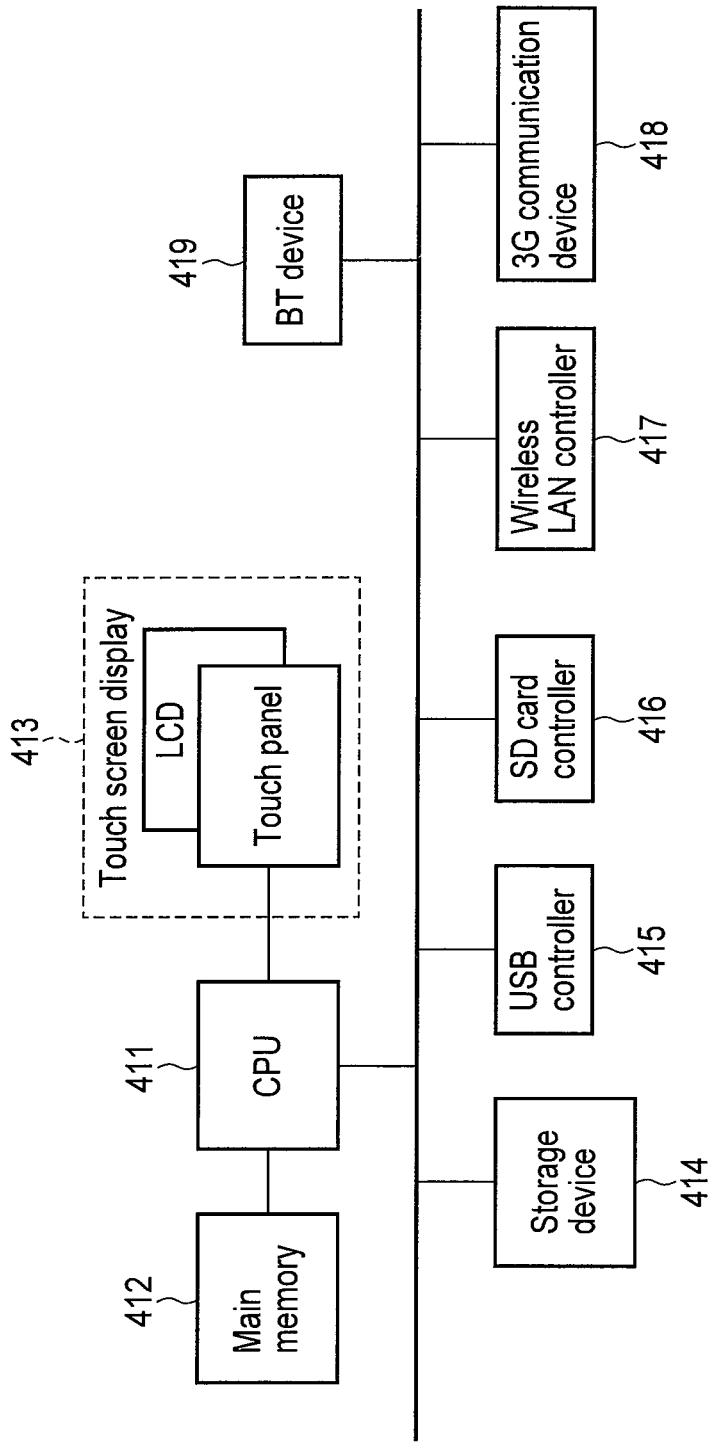
F I G. 8

INFORMATION PROCESSING APPARATUS AND CONTROL METHOD

CROSS-REFERENCE TO RELATED APPLICATIONS

This application is based upon and claims the benefit of priority from Japanese Patent Application No. 2012-250014, filed Nov. 14, 2012, the entire contents of which are incorporated herein by reference.

FIELD

Embodiments described herein relate generally to an information processing apparatus and control method for restricting executable processing.

BACKGROUND

Recently, it is receiving attention to bring a personally owned information terminal or the like into an office and use it for work (so-called Bring Your Own Device (BYOD)). As the information terminal, various information processing apparatuses such as a tablet terminal and smartphone are usable.

To implement BYOD, various security measures need to be taken for information processing apparatuses.

A personally owned information processing apparatus is used not only in an office but also in another environment such as home. If the same function restriction is always applied to the information processing apparatus, this may impair the usability of the information processing apparatus.

BRIEF DESCRIPTION OF THE DRAWING

A general architecture that implements the various features of the embodiments will now be described with reference to the drawings. The drawings and the associated descriptions are provided to illustrate the embodiments and not to limit the scope of the invention.

FIG. 3 is an exemplary block diagram showing the arrangement of a management application module arranged in the information processing apparatus according to the embodiment.

FIG. 8 is an exemplary block diagram showing an example of the hardware arrangement of the information processing apparatus according to the embodiment.

DETAILED DESCRIPTION

Various embodiments will be described hereinafter with reference to the accompanying drawings.

In general, according to one embodiment, an information processing apparatus includes a management module and a controller. The management module provides an environment for restricting an executable process of the information processing apparatus. The controller detects generation of an event which requests execution of processing, and transmits to the management module a content of the event prior to execution of processing corresponding to the event. The management module transmits to the controller a determination result which represents permission or inhibition of execution of the processing corresponding to the event. The determination result is decided based on a first policy or a second policy different from the first policy that are selectively employed in accordance with a use situation of the information processing apparatus. Further, the management module decides whether to notify a server of the content of the event, in accordance with which of a period in which the first policy is employed and a period in which the second policy is employed is a period in which the event has occurred.

Figure 1:
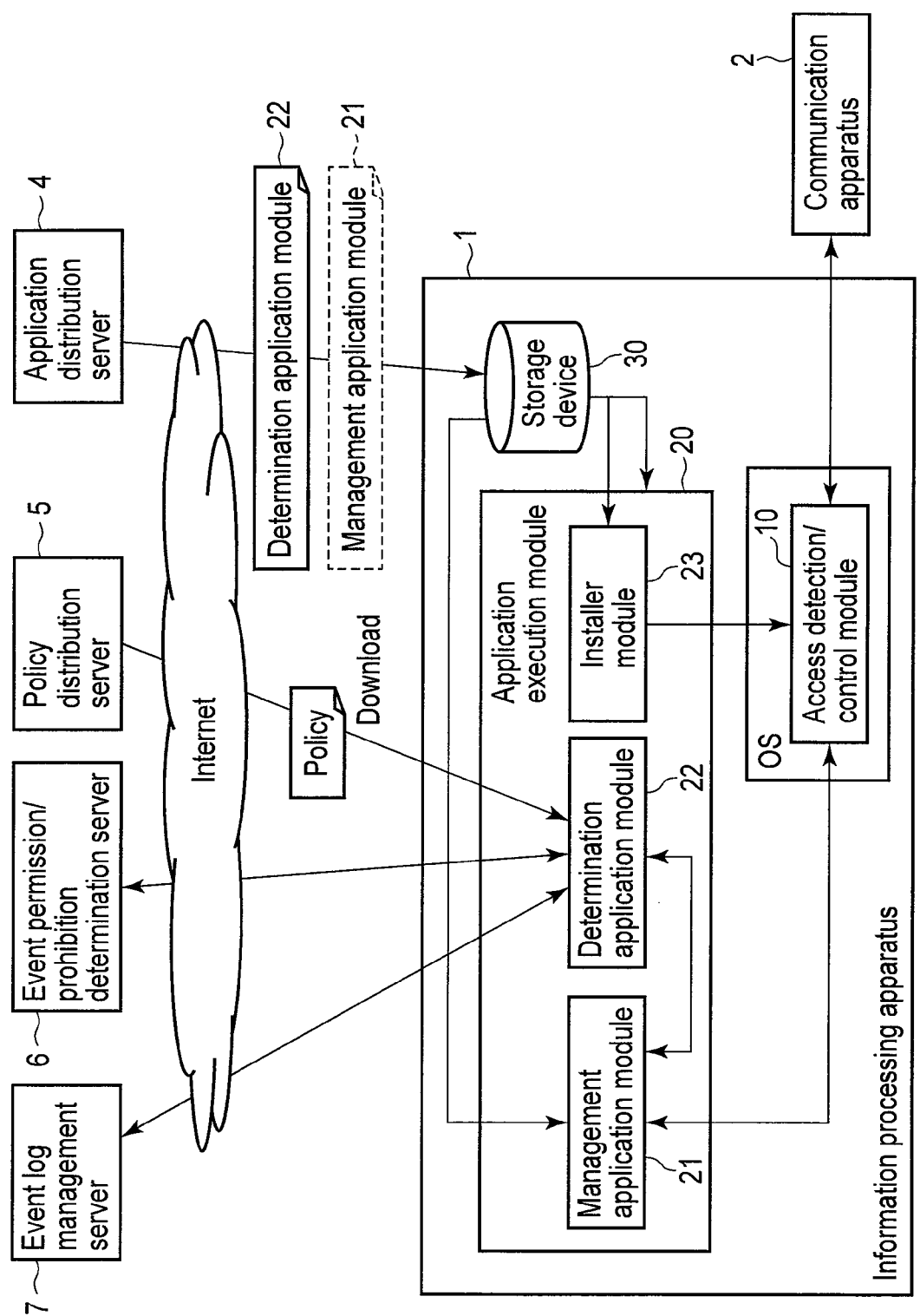
FIG. 1 is an exemplary block diagram showing the arrangement of an information processing apparatus according to an embodiment.

FIG. 1 shows the arrangement of an information processing apparatus 1 according to an embodiment. The information processing apparatus 1 is configured to execute various application programs, and can be implemented by, e.g., a tablet terminal, smartphone, PDA, or other various information terminals. The information processing apparatus 1 has a function of accessing an external storage device such as a USB memory or SD memory card. The information processing apparatus 1 is configured to execute wireless communications corresponding to several wireless communication standards such as WiFi®, third-generation mobile communication (3G), and Bluetooth®. By using the wireless communication function, the information processing apparatus 1 can communicate with an external communication apparatus 2 such as a wireless access point or various servers on the Internet.

The information processing apparatus 1 has a processing restriction function of restricting installation of several specific application programs, launch of several specific application programs, uninstallation of several specific application programs, connection between the information processing apparatus 1 and various external communication devices, connection between the information processing apparatus 1 and various external storage devices, and the like.

To implement the processing restriction function, the information processing apparatus 1 includes three different modules, that is, an access detection/control module 10, management application module 21, and determination application module 22.

The access detection/control module 10 can be implemented by a software module in the operating system (OS) layer. The software module may be middleware in the OS layer or a kernel such as a Linux® kernel in the OS layer. Each of the management application module 21 and determination application module 22 can be implemented by an application program to be executed on an application execution module 20. The application program may be, e.g., an Android® application program. In cooperation with the determination application module 22, the management application module 21 restricts various processes executable by the information processing apparatus 1.

The application execution module 20 is a platform for executing various application programs, and can be implemented by a virtual machine such as a Java® virtual machine.

The information processing apparatus 1 can download various application programs (various application package files) from an application distribution server 4 via the Internet. Each downloaded application program is stored in a storage device 30 in the information processing apparatus 1. The determination application module 22 is also downloaded from the application distribution server 4 and saved in the storage device 30. Each of the management application module 21 and an installer module 23 can also be downloaded from the application distribution server 4. The management application module 21 and installer module 23 may be pre-installed in the information processing apparatus 1. In this case, the management application module 21 need not always be downloaded. Similarly, the installer module 23 need not always be downloaded.

The installer module 23 expands the application package files of application programs (e.g., the management application module 21, the determination application module 22, and other various applications) downloaded from the application distribution server to the storage device 30, and installs them in the storage device 30.

The application execution module 20 loads the respective application programs (e.g., the management application module 21, the determination application module 22, the installer module 23, and other various applications) from the storage device 30, and executes them.

The access detection/control module 10 detects generation of an event which requests execution of processing, and transmits the contents of the event to the management application module 21 prior to execution of processing corresponding to the event. The access detection/control module 10 receives, from the management application module 21, a determination result representing permission or inhibition of execution of the processing corresponding to the event, and controls execution of the processing corresponding to the event based on the determination result. If the determination result represents permission of execution of the processing, the access detection/control module 10 executes the processing. If the determination result represents inhibition of execution of the processing, the access detection/control module 10 inhibits the processing.

Assume that installation and uninstallation of an application program is restricted. The access detection/control module 10 detects an event which requests installation or uninstallation of an application program, and notifies the management application module 21 of the name of the application to be installed or uninstalled before execution of the event, that is, before execution of installation or uninstallation. The access detection/control module 10 controls execution of installation or uninstallation based on a determination result from the management application module 21.

For example, if the access detection/control module 10 detects an event which requests installation of a given application program, it suspends processing of installing the application program, and transmits, to the management application module 21, the contents of the event containing the application name of the application program. Based on a determination result which is sent back from the management application module 21 and represents permission or inhibition of installation, the access detection/control module 10 executes installation processing or stops (inhibits) execution of installation processing.

Similarly, if the access detection/control module 10 detects an event which requests uninstallation of a given application program, it suspends processing of uninstalling the application program, and transmits, to the management application module 21, the contents of the event containing the application name of the application program. Based on a determination result which is sent back from the management application module 21 and represents permission or inhibition of uninstallation, the access detection/control module 10 executes uninstallation processing or stops (inhibits) execution of uninstallation processing.

The access detection/control module 10 can detect not only an event which requests installation or uninstallation of an application program, but also other various events. For example, the access detection/control module 10 detects various events such as a request to launch an application program, requests to connect various communication apparatuses (e.g., a request of connection to a WiFi® access point, a VPN connection request, and a request of connection to a Bluetooth® device), an SD card connection request, and a USB memory connection request. Also, when the access detection/control module 10 detects such an event other than installation and uninstallation events, it can transmit event information representing the contents of the detected event to the management application module 21 before execution of processing corresponding to the event, and control permission or inhibition of execution of the event based on a determination result from the management application module 21.

The management application module 21 functions as a management module which provides an environment for restricting an executable process of the information processing apparatus 1. When the management application module 21 is started, it can request the access detection/control module 10 to notify it of various events. Upon receiving an event (event information representing the contents of the event) from the access detection/control module 10, the management application module 21 notifies the determination application module 22 of the received event, and transmits, to the access detection/control module 10, a determination result (e.g., a determination result representing permission or inhibition of processing corresponding to the event) received from the determination application module 22.

Further, the management application module 21 has a function of executing signature verification for the determination application module 22, and determining whether the determination application module 22 is an integral determination application. The signature verification is executed upon, e.g., startup of the determination application module 22. In the signature verification, the management application module 21 acquires the application package file of the determination application module 22 that is saved in the storage device 30. Based on a certificate or the like contained in the application package file, the management application module 21 determines whether the determination application module 22 is an integral determination application. By this signature verification, it is verified whether the developer of the application package file of the determination application module 22 is correct or not. It is also verified whether the application package file is an unaltered authentic one.

The determination application module 22 has a predetermined policy (determination rule), determines, based on this policy, permission or inhibition of an event received from the management application module 21, and notifies the management application module 21 of the determination result. The policy may be a white list representing the contents of each event to be permitted or a black list representing the contents of each event to be inhibited, or have both of the white and black lists. If necessary, the determination application module 22 can download a policy (determination rule) from a policy distribution server 5. By downloading a policy (determination rule) from the policy distribution server 5, the policy can be periodically easily updated. A policy may be installed in advance in the determination application module 22. Further, the determination application module 22 can inquire, of an event permission/prohibition determination server 6, permission or inhibition of execution of an event.

In the embodiment, two types of policies (first policy and second policy) are selectively employed in accordance with the use situation of the information processing apparatus 1 in order to determine permission or inhibition of each event. The first policy is a policy (determination rule) for performing policy control (function restriction) which is premised on personal use of the information processing apparatus 1 at home or the like. The first policy represents each processing to be permitted or inhibited in the use situation in which the information processing apparatus 1 is personally used. The second policy is a policy (determination rule) for performing policy control (function restriction) which is premised on the use of the information processing apparatus 1 in an office for work. The second policy represents each processing to be permitted or inhibited in the use situation in which the information processing apparatus 1 is used for work. The contents of the first policy and those of the second policy are different. An operation mode in which the first policy is employed, that is, an operation mode for deciding permission or inhibition of execution of each event based on the first policy is called a private mode. In contrast, an operation mode in which the second policy is employed, that is, an operation mode for deciding permission or inhibition of execution of each event based on the second policy is called an office mode.

A policy to be employed can be automatically switched in accordance with the use situation of the information processing apparatus 1. For example, the policy to be employed may be switched from the first policy to the second policy on condition that the information processing apparatus 1 is connected to a specific network such as the network in the office. In this case, the access detection/control module 10 detects an event which requests connection to the office network, and the management application module 21 notifies the determination application module 22 of the contents of the event. When the management application module 21 notifies the determination application module 22 of the event during the period in which the first policy is employed (used), the determination application module 22 determines permission or prohibition of execution of processing corresponding to the event. The first policy may describe a determination rule to permit connection to the specific network (office network), and also describe an action which designates switching the policy to be employed from the first policy to the second policy. In this case, the determination application module 22 sends back, to the management application module 21, a determination result representing permission of execution of processing corresponding to the event, and switches the policy to be employed from the first policy to the second policy.

Further, the policy to be employed may be switched from the second policy to the first policy on condition that the information processing apparatus 1 is connected to another specific network such as a home network. In this case, the access detection/control module 10 detects an event which requests connection to the home network, and the management application module 21 notifies the determination application module 22 of the contents of the event. When the management application module 21 notifies the determination application module 22 of the event during the period in which the second policy is employed, the determination application module 22 may transmit, to the management application module 21, a determination result representing permission of execution of processing corresponding to the event, and switch the policy to be employed from the second policy to the first policy.

It is also possible to specify the current use location of the information processing apparatus 1 by a GPS, and switch the policy to be employed between the first policy and the second policy in accordance with the current use location.

Alternatively, the policy to be employed may be switched using communication between a security device installed in an entrance/exit gate in a facility such as a company, and the information processing apparatus 1. The communication between the security device and the information processing apparatus 1 can use close proximity wireless communication such as NFC. When the information processing apparatus 1 enters the facility such as the company, the policy to be employed is switched from the first policy to the second policy. When the information processing apparatus 1 exits from the facility such as the company, the policy to be employed is switched from the second policy to the first policy.

By inquiring, of the determination application module 22, a policy currently employed by the determination application module 22, or notifying the management application module 21 of a newly employed policy when the determination application module 22 changes the policy, the management application module 21 can determine which of the first policy and second policy is currently employed (used). Further, the management application module 21 has a function of deciding whether to notify a server (event log management server) 7 of the contents of each event, in accordance with which of the period in which the first policy is employed (used) and the period in which the second policy is employed (used) is a period in which the event has occurred. For each event generated in the period in which the first policy is employed, the management application module 21 decides not to notify the event log management server 7 of this event. This function can prevent transmitting, from the determination application module 22 to the event log management server 7, an event generated in the period in which the first policy is employed, that is, an event generated in the private mode. That is, upon receiving an event log inquiry from the event log management server 7, the determination application module 22 notifies the event log management server 7 of only each event generated in the office mode, and does not notify the event log management server 7 of each event generated in the private mode. This can protect the privacy of the user.

In accordance with a user operation, the installer module 23 instructs the access detection/control module 10 to start installation or uninstallation of an application program. In accordance with the instruction from the installer module 23, the access detection/control module 10 can detect an installation event or uninstallation event.

When a determination result notified by the management application module 21 represents inhibition of installation, the access detection/control module 10 inhibits installation (e.g., creation of a directory (folder) or file). This can prevent installation of an application program, the use of which is not permitted. To the contrary, when a determination result notified by the management application module 21 represents permission of installation, the access detection/control module 10 executes installation processing to install an application program.

Figure 2:
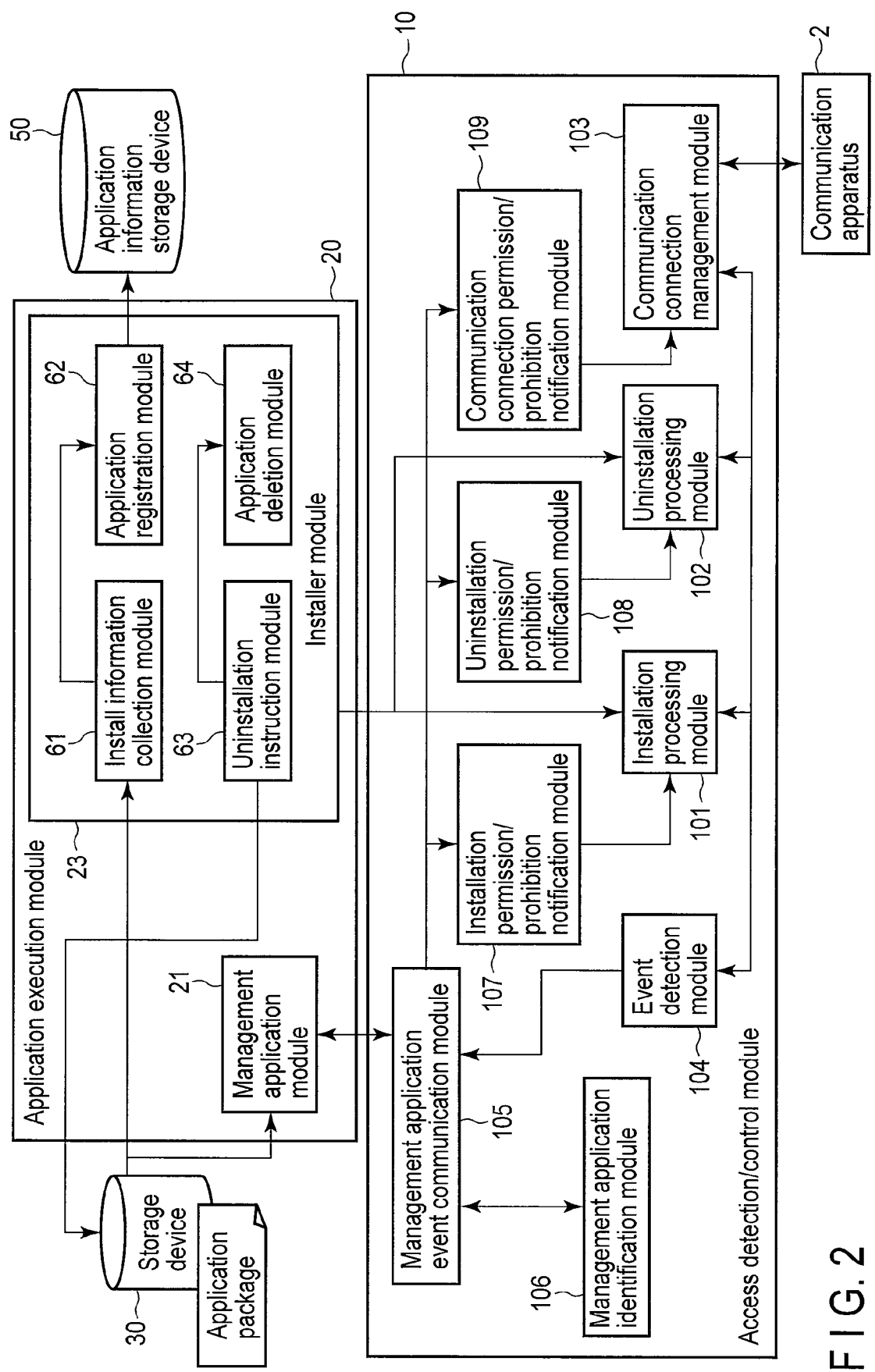
FIG. 2 is an exemplary block diagram showing the arrangements of an access detection/control module and application execution module arranged in the information processing apparatus according to the embodiment.

FIG. 2 shows the arrangements of the access detection/control module 10 and application execution module 20. Here, assume that installation, uninstallation, and connection to the external communication apparatus 2 are restricted.

As shown in FIG. 2, the installer module 23 (installation application) starts an installation or uninstallation instruction. In installation, an install information collection module 61 of the installer module 23 acquires, from the storage device 30, an application package file corresponding to an application to be installed. An application registration module 62 of the installer module 23 registers the application to be installed in an application information storage module 50 serving as a database which stores thumbnail image files and the like. The access detection/control module 10 executes actual installation processing such as file creation.

An uninstallation instruction module 63 instructs an application deletion module 64 to uninstall an application in accordance with a user operation, and also instructs the access detection/control module 10 to start uninstallation. The application deletion module 64 deletes, from the application information storage module 50, a thumbnail image file or the like corresponding to the application to be uninstalled.

The access detection/control module 10 includes an installation processing module 101, uninstallation processing module 102, communication connection management module 103, event detection module 104, management application event communication module 105, management application identification module 106, installation permission/prohibition notification module 107, uninstallation permission/prohibition notification module 108, and communication connection permission/prohibition notification module 109.

Upon receiving an installation start instruction (installation request) from the installer module 23, the installation processing module 101 causes the installer module 23 to suspend execution of installation processing. The event detection module 104 detects the generation of the installation request as an installation event. The management application event communication module 105 notifies the management application module 21 of event information (installation event information) containing the name of an application to be installed.

The management application identification module 106 identifies which of applications on the application execution module 20 is the management application module 21. Event information is detected by the event detection module 104, and then transmitted via the management application event communication module 105 to the application which is identified as the management application module 21 by the management application identification module 106. More specifically, the management application identification module 106 holds in advance the application name of the management application module 21. Upon receiving a registration request from an application, the management application identification module 106 determines, based on the application name held in advance, whether this application is the management application module 21 (an application program having the application name held in advance), that is, whether this application is a communication partner to which event information should be transmitted. If the management application identification module 106 determines that this application is a communication partner to which event information should be transmitted, it identifies this application as the management application module 21.

The management application event communication module 105 executes communication with the application program identified by the management application identification module 106. This can prevent interception of event information by an unauthentic application program.

Upon receiving the determination result of an installation event from the management application module 21, the management application event communication module 105 outputs the received determination result to the installation permission/prohibition notification module 107. The installation permission/prohibition notification module 107 controls the operation of the installation processing module 101 based on the contents of the determination result. If the determination result represents permission of installation, the installation processing module 101 executes installation processing in cooperation with the installer module 23. If the determination result represents inhibition of installation, the installation processing module 101 stops installation processing.

Upon receiving an uninstallation start instruction (uninstallation request) from the installer module 23, the uninstallation processing module 102 causes the installer module 23 to suspend execution of uninstallation processing. The event detection module 104 detects generation of the uninstallation request as an uninstallation event. The management application event communication module 105 notifies the management application module 21 of event information (uninstallation event information) containing the name of an application to be uninstalled.

Upon receiving a determination result representing permission or inhibition of execution of the uninstallation event from the management application module 21, the management application event communication module 105 outputs the received determination result to the uninstallation permission/prohibition notification module 108. The uninstallation permission/prohibition notification module 108 controls the operation of the uninstallation processing module 102 based on the contents of the determination result. If the determination result represents permission of uninstallation, the uninstallation processing module 102 executes uninstallation processing in cooperation with the installer module 23. If the determination result represents inhibition of uninstallation, the uninstallation processing module 102 does not execute uninstallation processing. This inhibits execution of uninstallation of an application requested by the user.

The communication connection management module 103 controls connection between the information processing apparatus 1 and the external communication apparatus 2 such as a WiFi® access point, Bluetooth® device, or another network device. When the communication connection management module 103 receives a connection establishment request from the external communication apparatus 2, or when a request to transmit a connection establishment request to the external communication apparatus 2 occurs, the communication connection management module 103 detects the generation of the connection request, and notifies the event detection module 104 that the connection request has occurred. The event detection module 104 detects the generation of the request of connection between the apparatus 1 and the external communication apparatus 2 as a network connection event. The management application event communication module 105 notifies the management application module 21 of event information (connection event) containing information representing the external communication apparatus to be connected.

Upon receiving a determination result representing permission or inhibition of execution of the connection event from the management application module 21, the management application event communication module 105 outputs the received determination result to the communication connection permission/prohibition notification module 109. The communication connection permission/prohibition notification module 109 controls the operation of the communication connection management module 103 based on the contents of the determination result. If the determination result represents permission of the connection, the communication connection management module 103 executes processing to establish connection with the communication apparatus to be connected. If the determination result represents inhibition of the connection, the communication connection management module 103 inhibits establishment of connection with the communication apparatus to be connected.

FIG. 3 shows the arrangement of the management application module 21.

The management application module 21 includes a communication processing module 201, service providing communication module 202, event processing module 203, event log management module 204, policy type management module 205, and event log database 206.

The communication processing module 201 executes communication with the access detection/control module 10. The communication processing module 201 receives various events (e.g., an installation event, request events of connection to various communication apparatuses, an SD card connection request event, a USB memory connection request event, and an uninstallation event) notified by the access detection/control module 10. Note that communication between the management application module 21 and the access detection/control module can use a method such as the signal system call.

The service providing communication module 202 executes communication with the determination application module 22. The event processing module 203 transmits the contents of an event to the determination application module 22 via the service providing communication module 202, and receives, from the determination application module 22 via the service providing communication module 202, a determination result representing permission or inhibition of execution of the event. That is, the event processing module 203 receives, from the determination application module 22, a determination result which is decided based on the first or second policy and represents permission or inhibition of execution of processing corresponding to an event. Then, the event processing module 203 transmits the determination result to the access detection/control module 10 via the communication processing module 201. If the information processing apparatus 1 is in the private mode, that is, if the policy currently employed by the determination application module 22 is the first policy, the event processing module 203 transmits a determination result decided based on the first policy to the access detection/control module 10 via the communication processing module 201. If the information processing apparatus 1 is in the office mode, that is, if the policy currently employed by the determination application module 22 is the second policy, the event processing module 203 transmits a determination result decided based on the second policy to the access detection/control module 10 via the communication processing module 201.

To prevent notification of each event generated in the private mode to the event log management server 7, the event log management module 204 records, as a notification inhibition target event log in the event log database 206, the contents of an event group (the contents of the first event group) generated in the period in which first policy is employed. The policy type management module 205 periodically inquires a currently employed policy of the determination application module 22 via the service providing communication module 202. Accordingly, the policy type management module 205 manages a policy currently used by the determination application module 22, that is, the current mode (private mode or office mode). The event log management module 204 communicates with the policy type management module 205 to determine whether the currently employed policy is the first policy. If the currently employed policy is the first policy, the event log management module 204 records, in the event log database 206, the contents of each event received from the event processing module 203. If the currently employed policy is the second policy, the event log management module 204 does not record, in the event log database 206, the contents of each event received from the event processing module 203.

The service providing communication module 202 notifies the determination application module 22 the contents of each event recorded in the event log database 206 as the notification inhibition target event log. If the determination application module 22 receives an event log inquiry from the event log management server 7, it inquires a notification inhibition target event log of the management application module 21. In response to the inquiry from the determination application module 22, the service providing communication module 202 notifies the determination application module 22 of the notification inhibition target event log.

The determination application module 22 removes, from all generated events, the events (first event group) included in the notification inhibition target event log, and transmits only the remaining events to the event log management server 7. The determination application module 22 may record all events received from the management application module 21, and transmit, to the event log management server 7, events which remain after removing the first event group from these events. Alternatively, in response to an event log inquiry from the event log management server 7, the determination application module 22 may acquire all generated events from the operating system, and transmit, to the event log management server 7, events which remain after removing the first event group from these events.

Note that the determination application module 22 may record, as a notification target event log, only events received from the management application module 21 during the period in which the second policy is employed.

Figure 4:
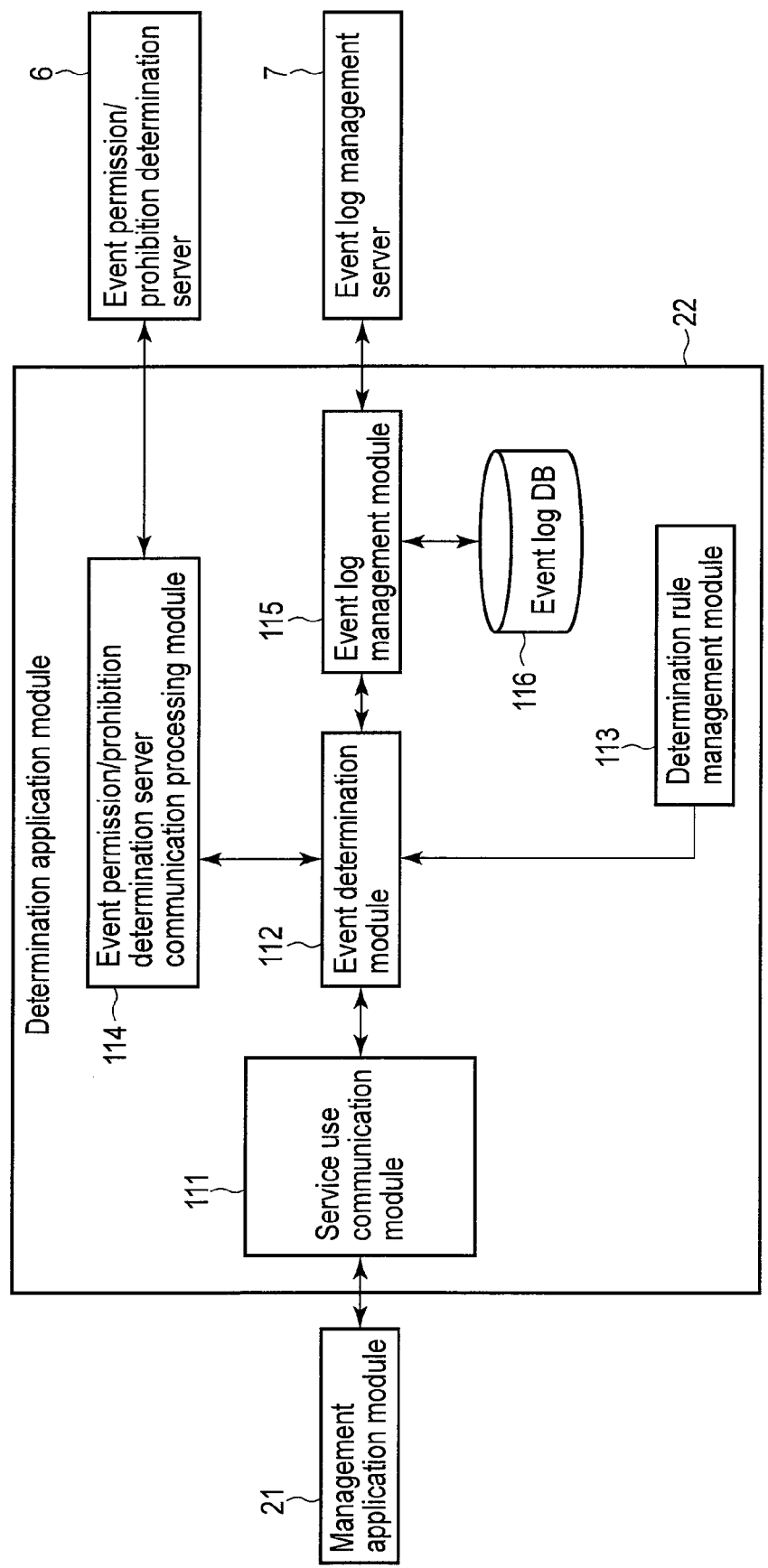
FIG. 4 is an exemplary block diagram showing the arrangement of a determination application module arranged in the information processing apparatus according to the embodiment.

FIG. 4 shows the arrangement of the determination application module 22. As shown in FIG. 4, the determination application module 22 includes a service use communication module 111, event determination module 112, determination rule management module 113, event permission/prohibition determination server communication processing module 114, event log management module 115, and event log database 116.

The service use communication module 111 communicates with the management application module 21. The event determination module 112 selectively employs (selectively uses) the first and second policies present in the determination rule management module 113, and determines permission or inhibition of execution of processing corresponding to each event based on the currently employed policy.

The event permission/prohibition determination server communication processing module 114 inquires, of the event permission/prohibition determination server 6, permission or prohibition of execution of processing corresponding to each event, and receives permission or prohibition of execution of the processing from the event permission/prohibition determination server 6. If necessary, the event determination module 112 can determine permission or prohibition of execution of processing by using the event permission/prohibition determination server communication processing module 114.

The event log management module 115 records, in the event log database 116, for example, only an event group obtained by removing a notification inhibition target event group (first event group) from all generated events. Then, the event log management module 115 transmits, to the event log management server 7, the contents of each event recorded in the event log database 116.

Figure 5:
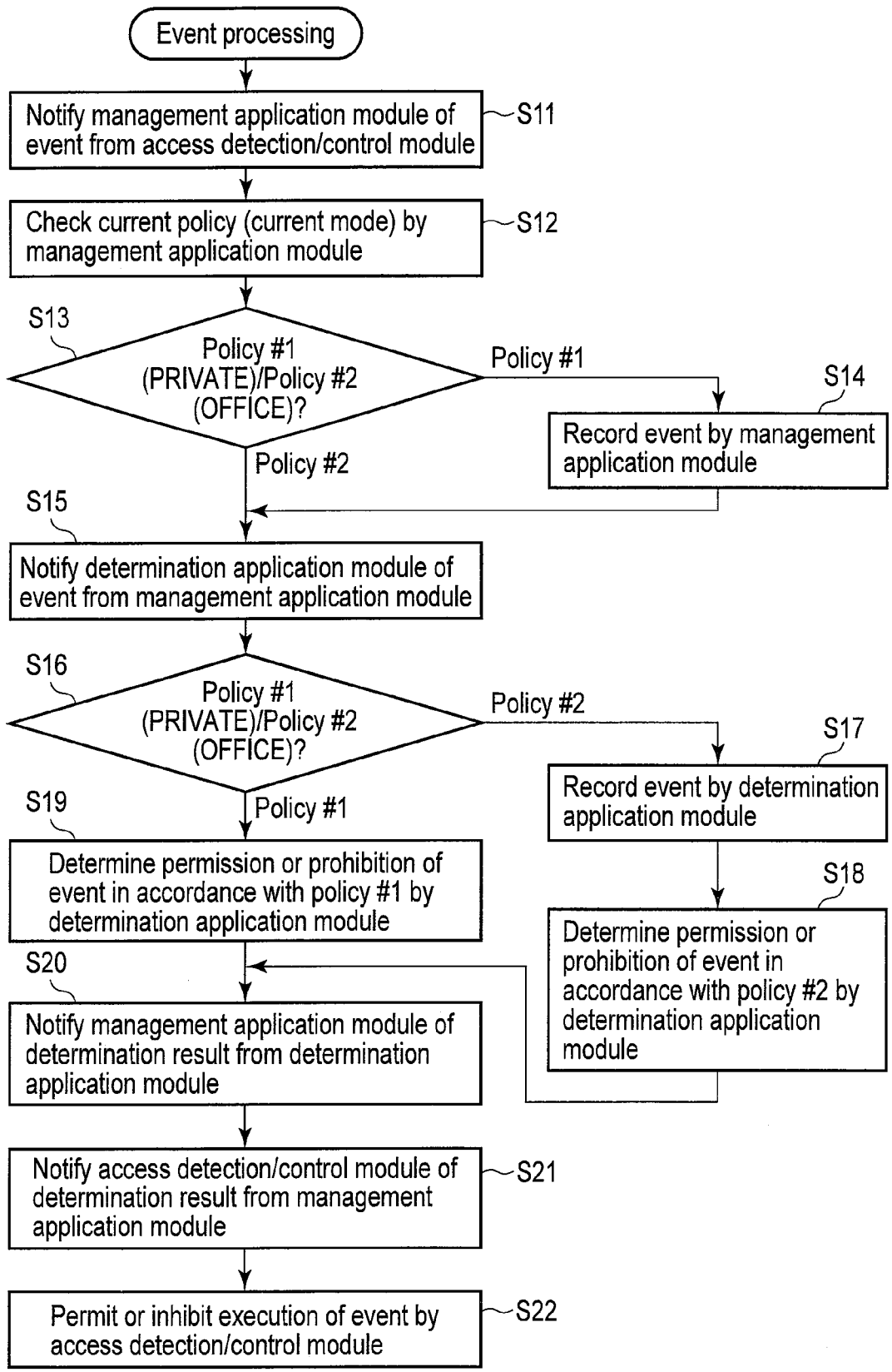
FIG. 5 is an exemplary flowchart showing the sequence of processing to be executed by the information processing apparatus according to the embodiment upon generation of an event.

The flowchart in FIG. 5 shows the sequence of event processing to be executed by the information processing apparatus 1 upon generation of an event.

The access detection/control module 10 detects generation of an event, and notifies the management application module 21 of the contents of the event (step S11). The management application module 21 checks the currently employed policy (current mode), and determines which of the first policy (private mode) and the second policy (office mode) is the currently employed policy (steps S12 and S13).

If the currently employed policy is the first policy (private mode) (policy #1 in step S13), the management application module 21 records, as a notification inhibition target event in the event log database 206, the contents of the event received from the access detection/control module 10 (step S14). The management application module 21 then notifies the determination application module 22 of the contents of the event received from the access detection/control module 10 (step S15).

If the currently employed policy is the second policy (office mode) (policy #2 in step S13), the management application module 21 notifies the determination application module 22 of the contents of the event received from the access detection/control module 10 without recording the contents in the event log database 206 (step S15).

While the determination application module 22 determines permission or prohibition of execution of the event by employing (using) the second policy (policy #2 in step S16), it records, as a notification target event in the event log database 116, the contents of the event received from the management application module 21 (step S17). The determination application module 22 determines permission or prohibition of execution of the event received from the management application module 21 in accordance with the second policy (step S18).

While the determination application module 22 determines permission or prohibition of execution of the event by employing (using) the first policy (policy #1 in step S16), it does not record, in the event log database 116, the contents of the event received from the management application module 21. The determination application module 22 determines permission or prohibition of execution of the event received from the management application module 21 in accordance with the first policy (step S19).

The determination application module 22 notifies the management application module 21 of a determination result which is decided based on the first or second policy and represents permission or inhibition of execution of processing corresponding to the event (step S20). The management application module 21 notifies the access detection/control module 10 of the determination result received from the determination application module 22 (step S21). Based on the determination result received from the management application module 21, the access detection/control module 10 executes processing corresponding to the detected event or inhibits the execution (step S22).

Figure 6:
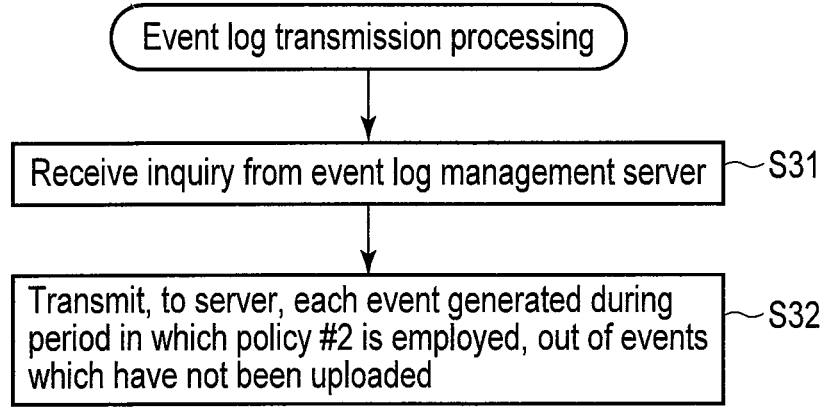
FIG. 6 is an exemplary flowchart showing the sequence of event log transmission processing to be executed by the information processing apparatus according to the embodiment.

The flowchart in FIG. 6 shows an example of the sequence of event log transmission processing to be executed by the determination application module 22.

If the determination application module 22 receives an event log inquiry from the event log management server 7 (step S31), it transmits, to the event log management server 7, only an event group which has not been uploaded to the event log management server 7 and has occurred during the period in which the second policy is employed (step S32). When only an event group generated during the period in which the second policy is employed is recorded in the event log database 116, the determination application module 22 suffices to acquire, from the event log database 116, each event which has not been uploaded, and transmit the acquired event to the event log management server 7.

Note that the determination application module 22 may acquire all generated events from the operating system, or record all events received from the management application module 21 as all generated events. In this case, the determination application module 22 suffices to transmit, to the event log management server 7, only an event group which remains after removing a notification inhibition target event group from all generated events.

Figure 7:
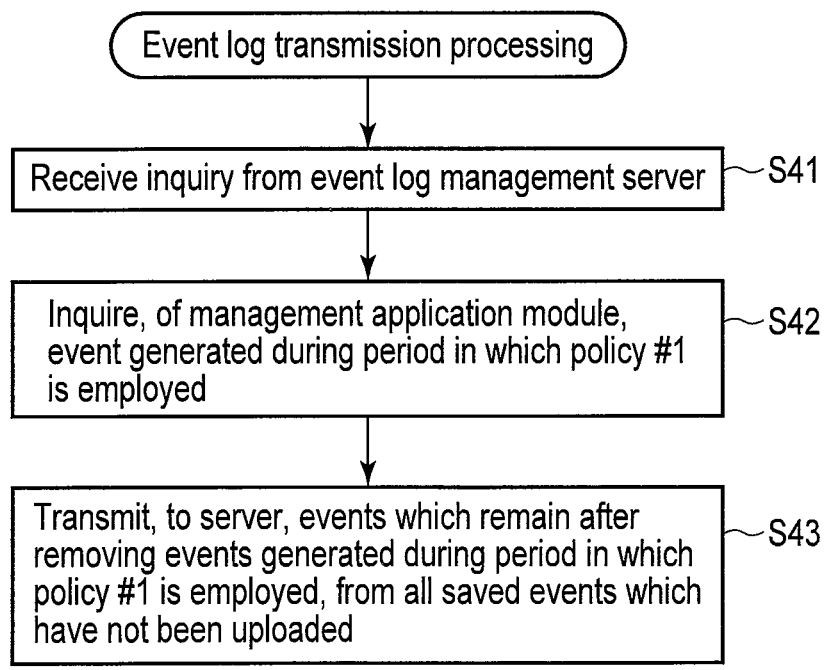
FIG. 7 is an exemplary flowchart showing another sequence of event log transmission processing to be executed by the information processing apparatus according to the embodiment.

The flowchart in FIG. 7 shows another example of the sequence of event log transmission processing to be executed by the determination application module 22.

Assume that all events received from the management application module 21 are recorded in the event log database 116.

If the determination application module 22 receives an event log inquiry from the event log management server 7 (step S41), it inquires, of the management application module 21, an event generated during the period in which the first policy is employed, and acquires, from the management application module 21, an event group generated during the period in which the first policy is employed (step S42). The determination application module 22 extracts, from the event log database 116, an event group which has not been uploaded to the event log management server 7, and removes the event group generated during the period in which the first policy is employed. Then, the determination application module 22 transmits only the remaining event group to the event log management server 7 (step S43).

As described above, the determination application module 22 may acquire all generated events from the operating system, and transmit, to the event log management server 7, only an event group which remains after removing, from these events, an event group generated during the period in which the first policy is employed.

FIG. 8 exemplifies the hardware arrangement of the information processing apparatus 1. The information processing apparatus 1 includes a CPU 411, main memory 412, touch screen display 413, storage device 414, USB controller 415, SD card controller 416, wireless LAN controller 417, 3G communication device 418, and Bluetooth® device (BT device) 419.

The CPU 411 is a processor which controls each component in the information processing apparatus 1. The CPU 411 executes various software programs loaded from the storage device 414 to the main memory 412, such as an OS and application program. The access detection/control module 10 is executed as part of the OS.

The management application module 21 and determination application module 22 are implemented as different application programs, as described above. An application program corresponding to the management application module 21 may be preinstalled in the storage device 414, as described above.

An application program corresponding to the determination application module 22 is, e.g., an application program prepared for each company, and determines permission or inhibition of execution of an event in accordance with a determination rule suited to a corresponding company. Since the determination application module 22 is a module different from the management application module 21, a determination application suited to a company can be easily created for each company.

The touch screen display 413 is a display capable of detecting a touch position on the screen, and includes a flat panel display such as a liquid crystal display (LCD), and a touch panel.

The USB controller 415 is configured to communicate with a USB device (e.g., a USB memory) attached to a USB port provided in the information processing apparatus 1. The SD card controller 416 is configured to communicate with a memory card (e.g., an SD card) inserted into a card slot provided in the information processing apparatus 1. The wireless LAN controller 417 is a wireless communication device configured to execute wireless communication complying with WiFi® or the like. The 3G communication device 418 is a wireless communication device configured to execute 3G mobile communication. The Bluetooth® device 419 is a wireless communication device configured to communicate with an external Bluetooth® device.

As described above, according to the embodiment, the contents of an event which requests execution of processing is transmitted from the access detection/control module 10 to the management application module 21. The management application module 21 transmits, to the access detection/control module 10, a determination result which is decided based on the first or second policy selectively employed in accordance with the use situation of the information processing apparatus 1, and represents permission or inhibition of execution of processing corresponding to the event. In this manner, permission or inhibition of execution of processing corresponding to an event is determined by a determination program (determination application module 22) independent of the management application module 21. For example, by preparing a determination program for each company, permission or prohibition of installation can be determined using a rule set which is different between companies.

Since the first and second policies are selectively employed, a flexible function restriction can be executed.

Further, in accordance with which of the period in which the first policy is employed and the period in which the second policy is employed is the period in which an event has occurred, the management application module 21 decides whether to notify the server of the contents of the event. This can prevent notification of each event generated in the private mode to the event log management server 7, protecting the privacy of the user.

Since the management application module 21 provides an environment for restricting executable processing such as communication with the access detection/control module 10, the arrangement of the determination application module 22 can be simplified.

The management application module 21 can also be implemented by an application program, so the management application module 21 itself can be easily updated.

The management application module 21 confirms the integrity of the determination application module 22 based on a signature added to the determination application module 22. When the integrity of the determination application module 22 is confirmed, the management application module 21 identifies the determination application module 22 as a communication partner to which the contents of an event should be notified. Therefore, the use of a false determination application can be reliably prevented.

Note that all processing procedures according to the embodiment can be implemented by software. Hence, the same effects as those of the embodiment can be easily implemented by installing a compute program for executing these procedures in a general computer via a computer-readable storage medium which stores the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a management processor configured to provide an environment for restricting an executable process of the information processing apparatus; and
a controller configured to detect generation of an event indicative of a request to execute processing, and to transmit to the management processor a content of the event prior to execution of the processing corresponding to the event,
wherein the management processor is further configured to maintain a first policy and a second policy different from the first policy, the first policy and the second policy being selectively employed in accordance with a use situation of the information processing apparatus, and to transmit to the controller a determination result which represents permission or inhibition of execution of the processing corresponding to the event, the determination result being decided based on which of the first policy or the second policy is employed, and
wherein the management processor is further configured to decide, for a first event group generated in a period in which the first policy is employed, not to notify a server of a content of the first event group, and to decide, for a second event group generated in a period in which the second policy is employed, to notify the server of a content of the second event group.

2. The apparatus of claim 1, wherein
the first policy represents each processing to be permitted or inhibited in a first use situation in which the information processing apparatus is personally used, and
the second policy represents each processing to be permitted or inhibited in a second use situation in which the information processing apparatus is used for work.

3. The apparatus of claim 1, wherein the management processor is configured to notify a determination program of the content of the event, and to receive the determination result from the determination program.

4. The apparatus of claim 3, wherein
the management processor is configured to record the content of the first event group generated in the period in which the first policy is employed, and to notify the determination program of the content of the first event group, and
the determination program is configured to remove the first event group from all generated events to obtain the second event group, and transmit the second event group to the server.

5. The apparatus of claim 3, wherein when a first event indicative of a request for specific processing is notified by the management processor during the period in which the first policy is employed, the determination program is configured to switch from the first policy to the second policy.

6. The apparatus of claim 3, wherein
the controller comprises a software module in an operating system layer,
the management processor comprises a first application program to be executed in an application layer, and
the determination program is configured to be executed in the application layer.

7. The apparatus of claim 3, wherein the management processor is configured to confirm integrity of the determination program based on a certificate added to the determination program, and if integrity of the determination program is confirmed, to identify the determination program as a communication partner to which the content of the event is to be transmitted.

8. A control method for restricting an executable process of an information processing apparatus, comprising:
detecting generation of an event indicative of a request to execute processing;
prior to execution of the processing corresponding to the event, transmitting a content of the event to a management module configured to provide an environment for restricting the executable processing, wherein the management module maintains a first policy and a second policy different from the first policy, the first policy and the second policy being selectively employed in accordance with a use situation of the information processing apparatus;
executing the processing corresponding to the event if a determination result represents permission of execution of the processing corresponding to the event, wherein the determination result is decided based on which of the first policy or the second policy is employed; and
deciding, for a first event group generated in a period in which the first policy is employed, not to notify a server of a content of the first event group, and deciding, for a second event group generated in a period in which the second policy is employed, to notify the server of a content of the second event group.

9. The control method of claim 8, wherein
the first policy represents each processing to be permitted or inhibited in a first use situation in which the information processing apparatus is personally used, and
the second policy represents each processing to be permitted or inhibited in a second use situation in which the information processing apparatus is used for work.

10. A computer readable, non transitory storage medium comprising a computer program configured to be executed by a computer, the computer program controlling the computer to execute functions of:
detecting generation of an event indicative of a request to execute processing;
prior to execution of the processing corresponding to the event, transmitting a content of the event to a management module configured to provide an environment for restricting an executable process of the computer, wherein the management module maintains a first policy and a second policy different from the first policy, the first policy and the second policy by being selectively employed in accordance with a use situation of the computer;
executing the processing corresponding to the event if a determination result represents permission of execution of the processing corresponding to the event, wherein the determination result is decided based on which of the first policy or the second policy is employed; and
deciding, for a first event group generated in the period in which the first policy is employed, not to notify a server of a content of the first event group, and deciding, for a second event group generated in a period in which the second policy is employed, to notify the server of a content of the second event group.

11. The storage medium of claim 10, wherein
the first policy represents each processing to be permitted or inhibited in a first use situation in which the computer is personally used, and
the second policy represents each processing to be permitted or inhibited in a second use situation in which the computer is used for work.

* * * * *